(12) United States Patent
Fuller

(10) Patent No.: US 7,056,261 B2
(45) Date of Patent: Jun. 6, 2006

(54) HYDRAULIC CONTROL CIRCUIT FOR A CONTINUOUSLY VARIABLE TRANSMISSION

(75) Inventor: John William Edward Fuller, Preston (GB)

(73) Assignee: Torotrak (Development) Limited (GB)

( * ) Notice: Subject to any disclaimer, the term of this patent is extended or adjusted under 35 U.S.C. 154(b) by 6 days.

(21) Appl. No.: 10/479,539

(22) PCT Filed: May 31, 2002

(86) PCT No.: PCT/GB02/02574

§ 371 (c)(1),
(2), (4) Date: Dec. 4, 2003

(87) PCT Pub. No.: WO02/099317

PCT Pub. Date: Dec. 12, 2002

(65) Prior Publication Data

US 2004/0171457 A1    Sep. 2, 2004

(30) Foreign Application Priority Data

Jun. 4, 2001  (GB) .................................. 0113523.5

(51) Int. Cl.
*B60W 10/04* (2006.01)
*B60W 10/10* (2006.01)
*F16H 61/30* (2006.01)

(52) U.S. Cl. ............................. 477/37; 477/50; 476/10
(58) Field of Classification Search .................. 477/37, 477/50; 476/9, 10
See application file for complete search history.

(56) References Cited

U.S. PATENT DOCUMENTS

| 4,524,641 A | * | 6/1985 | Greenwood | 476/10 |
| 5,090,951 A | * | 2/1992 | Greenwood | 475/216 |
| 5,099,710 A | * | 3/1992 | Nakano | 476/10 |
| 5,938,557 A | * | 8/1999 | Greenwood | 475/216 |

FOREIGN PATENT DOCUMENTS

| GB | 2 312 258 | 10/1997 |
| WO | WO 95/17621 | 6/1995 |
| WO | WO 99/58883 | 11/1999 |

* cited by examiner

Primary Examiner—Tisha Lewis
(74) Attorney, Agent, or Firm—Brooks Kushman P.C.

(57) ABSTRACT

A hydraulic circuit for a continuously variable transmission having a continuously variable ratio unit that is controlled by at least one hydraulic actuator acting on a movable torque transmission element. The actuator has opposed first and second working chambers. The circuit includes first and second flow lines that are connected to two respective actuator working chambers. The lines feed fluid thereto and therefrom A pressurized supply of fluid urges fluid flow through the flow lines. A variable control valve is incorporated in both flow lines. Each valve generates an adjustable back pressure therein. A further valve is connected between the two flow lines. The further valve has a variable opening and is located upstream of the variable control valve. Opening of the further valve enables flow fluid from one flow line to the other to reduce pressure difference between the lines.

24 Claims, 3 Drawing Sheets

HYDRAULIC CONTROL CIRCUIT FOR A CONTINUOUSLY VARIABLE TRANSMISSION

BACKGROUND OF THE INVENTION

1. Field of the Invention

The present invention relates generally to continuously variable transmissions and more specifically to hydraulic control thereof.

2. Background Art

The invention is particularly, although not exclusively, applicable to transmissions which incorporate a ratio varying unit ("variator") of the toroidal-race rolling traction type to provide the required continuously-variable transmission ratio. Major components of a known variator 10 of the "full toroidal" type are illustrated in FIG. 1. Here, two input discs 12, 14 are mounted upon a drive shaft 16 for rotation therewith and have respective part toroidal surfaces 18, 20 facing toward corresponding part toroidal surfaces 22, 24 formed upon a central output disc 26. The output disc is journalled such as to be rotatable independently of the shaft 16. Drive from an engine or other prime mover, input via the shaft 16 and input discs 12, 14, is transferred to the output disc 26 via a set of rollers disposed in the toroidal cavities. A single representative roller 29 is illustrated but typically three such rollers are provided in both cavities. An end load applied across the input discs 12, 14 by a hydraulic ram 15 provides contact forces between rollers and discs to enable such transfer of drive. Drive is taken from the output disc to further parts of the transmission, typically an epicyclic mixer, as is well known in the art and described e.g. in UK patent application 8429823. Each roller is journalled in a respective carriage 30 which is itself coupled to a hydraulic actuator 32 whereby an adjustable translational force can be applied to the roller/carriage combination. As well as being capable of translational motion the roller/carriage combination is able to rotate about an axis determined by the hydraulic actuator 32 to change the "tilt angle" of the roller and to move the contacts between rollers and discs, thereby varying the variator transmission ratio, as is well known to those skilled in the art.

The illustrated variator is of the type known in the art as "torque control". The hydraulic actuator 32 exerts a controlled force on the roller/carriage and for equilibrium this must be balanced by the reaction force upon the roller resulting from the torques transmitted between the disc surfaces 18, 20, 22, 24 and the roller 28. As is well known in the art, the center of the roller is constrained to follow the center circle of the torus defined by the relevant pair of discs. The axis determined by the actuator 32 is angled to the plane of this center circle. This angle is referred to as the "castor angle". The well known result of this arrangement is that in use each roller automatically moves and precesses to the location and tilt angle required to transmit a torque determined by the biasing force from the actuator 32.

The biasing force is controlled by means of a hydraulic circuit through which fluid is supplied to the actuators at variable pressure.

It will be appreciated that while the equilibrium position of the rollers is uniquely determined by the balance of the reaction force and the applied biasing force, there is the potential for unwanted oscillatory motion of the roller/carriage combination about this position, with resulting impairment of transmission function. More than one mode of oscillation is possible but in the simplest such mode all rollers oscillate in unison and this oscillatory motion is accompanied by a corresponding flow of fluid in the hydraulic circuit.

Damping of such oscillation can be provided by means of the hydraulic circuit and specifically by suitably restricting or throttling fluid flow to and from the actuators 32. Such restriction of flow can tend to restrict the motion of the rollers required to effect ratio change, but it has been found that in a lightly damped system these conflicting requirements can be satisfied in a manner which is entirely satisfactory under the majority of operating conditions.

However, particularly stringent requirements are imposed on the transmission during very rapid changes of vehicle speed, particularly in the case of an emergency rapid "brake to rest" e.g. an emergency stop. In order to maintain engine speed and to avoid stalling the engine, rapid ratio change is required of the variator. This is particularly significant in a transmission of the "geared neutral" type in which the variator remains coupled to the vehicles wheels even while the wheels are stationary—that is, in vehicles lacking a clutch or other means to isolate wheels and engine. The high rate of ratio change required during a rapid brake to rest corresponds to a rapid motion of the variator rollers, but if adequate hydraulic flow to accommodate such motion is not available—particularly because such flow is restricted—the rollers can fail to move with sufficient speed, leading e.g. to an engine stall. Within the hydraulic circuit the effect can be a large increase in pressure on one side of the circuit and a large fall in pressure on the other side of the circuit. The result must be a large net biasing force on the roller/carriage combinations and this is reflected in a large variator torque which is the cause of the engine stall.

The applicant's own European patent 1076786 and its US counterpart application Ser. No. 09/678,483 describe a hydraulic variator control circuit in which, by appropriate setting of certain valves, a connection can be made from one side of the actuator 32 to the other, allowing rapid movement of the actuator and its roller in order to effect rapid ratio change. However the switching valves used in this arrangement provide no control of the resulting flow—control of the variator is effectively lost when the valves are set as just mentioned. The valves used to normally control hydraulic pressures applied to the variator are rendered ineffective. This is incompatible with maintenance of stable variator control.

SUMMARY OF THE INVENTION

It is an object of the present invention to overcome or alleviate one or more of the above problems associated with known continuously variable transmissions.

In accordance with a first aspect of the present invention, there is a hydraulic circuit for a continuously variable transmission comprising a continuously variable ratio unit ("variator") which is controllable by means of at least one hydraulic actuator acting on a movable torque transmission element of the variator, the actuator having opposed first and second working chambers and the circuit comprising first and second flow lines both connected to respective actuator working chambers for feeding fluid thereto and therefrom and means for supplying fluid flow through both of the flow lines, variable control valve means being incorporated in both flow lines for generating an adjustable back pressure therein and a further valve being connected between the two flow lines, upstream of the variable control valve means, whereby opening of the further valve enables flow of fluid from one flow line to the other in order to reduce pressure difference between the lines.

By opening the further valve when required the above described problems associated with rapid brake to rest can be prevented.

The use of the variable control valve means in the flow lines is in itself conventional. In known circuits the required damping is in fact largely contributed by the control valve means. Due to its placement upstream of the control valve means, the further valve bypasses the control valve means so that it serves while open to remove or reduce hydraulic damping of actuator motion.

The further valve can serve to relieve both excessive pressure build up in one line and excessively low pressure in the other.

Preferably the further valve has a variable opening. That is, the valve has several intermediate states between maximum opening and closed. Most preferably the valve has a continuously variable opening. Hence the valve can provide a variable degree of relief from one flow line to the other and in this way the opposed requirements for variator damping and (occasional) rapid variator response can be balanced.

Preferably, the further valve is a flow control valve.

It is especially preferred that the circuit is further provided with an electronic control unit (ECU) whereby the opening of the further valve is determined in dependence on measured transmission and/or vehicle operating conditions.

The ECU can establish when operating conditions require opening of the valve, e.g. during rapid brake to rest, and respond accordingly. This may for example be achieved by monitoring engine speed and transmission output speed.

Preferably the ECU is such that after opening the further valve during a rapid change of transmission ratio, it closes the further valve or at least reduces the degree of opening of the valve as the transmission approaches neutral.

It has been found that in this way rapid ratio change may be provided for without an unacceptable degree of oscillation and consequent transmission instability.

BRIEF DESCRIPTION OF THE DRAWINGS

A specific embodiment of the present invention will now be described, by way of example only, with reference to the accompanying drawings, in which.

DETAILED DESCRIPTION OF THE PREFERRED EMBODIMENTS

Figure 1:
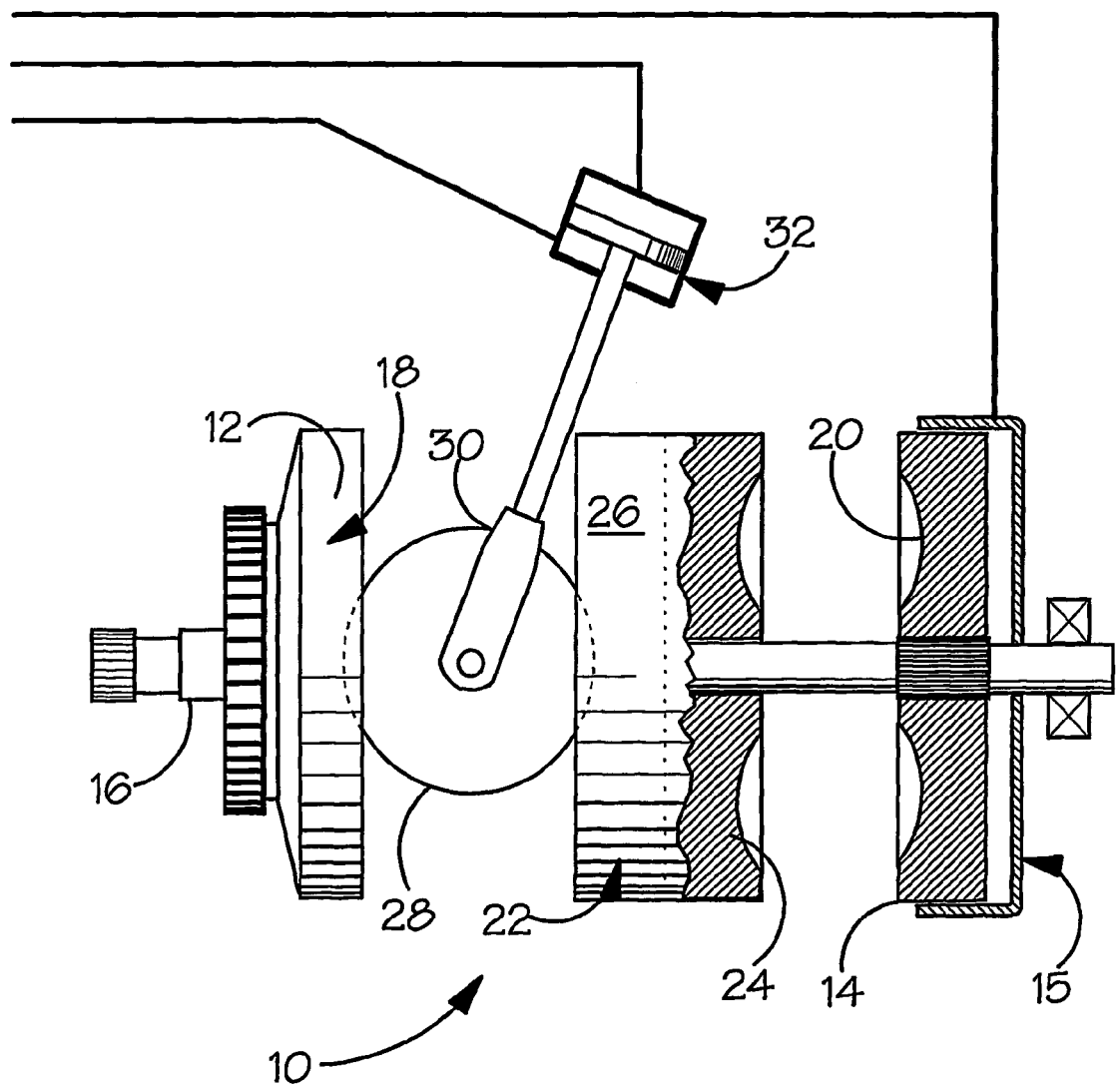
FIG. 1 is a simplified illustration of a known toroidal-race rolling traction type variator which is suitable for control by the hydraulic circuit to be described below.
Figure 2:
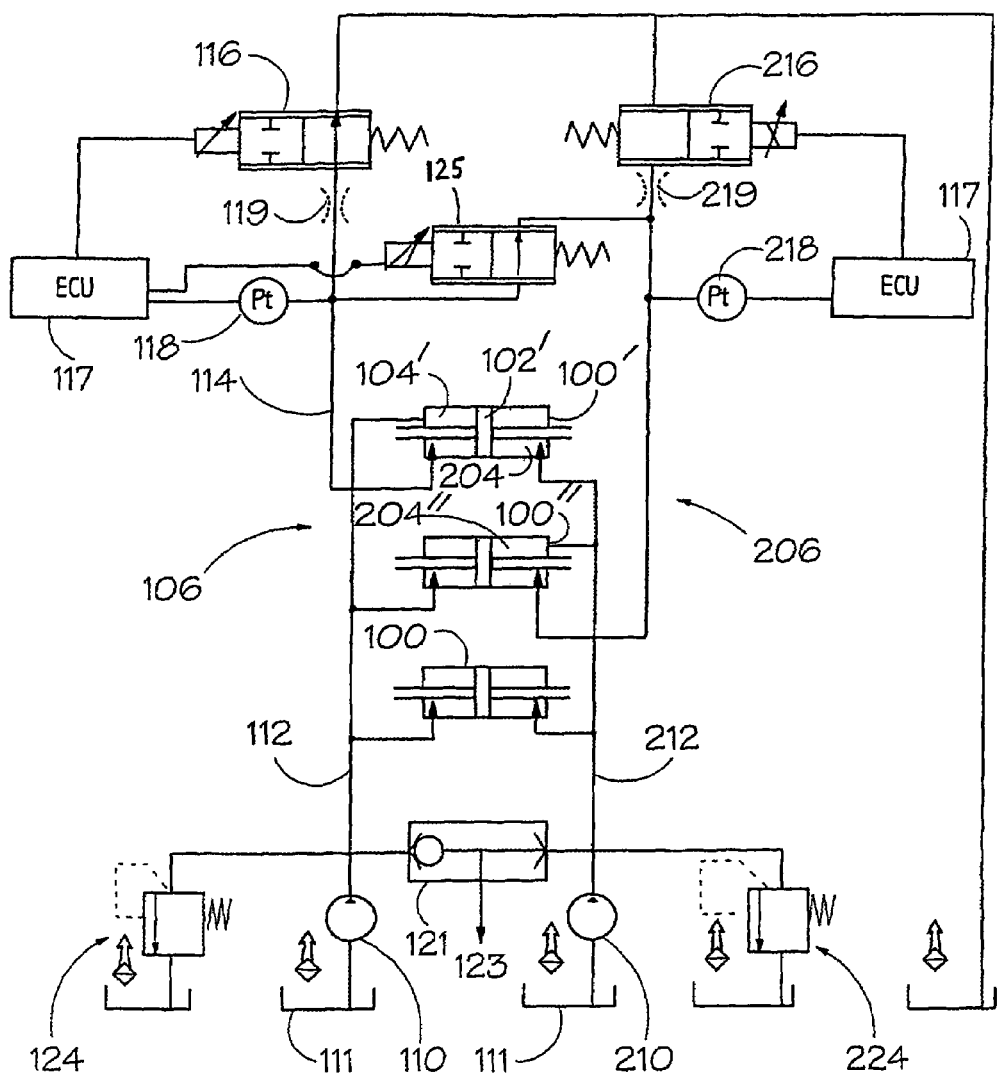
FIG. 2 is a symbolic illustration of a hydraulic circuit embodying the present invention.

The hydraulic circuit illustrated in FIG. 2 is suitable for use with a torque control variator of the type described above with reference to FIG. 1. FIG. 2 shows, by way of illustration, a set of three hydraulic actuators 100, 100' and 100" (typically in a variator of the above described twin cavity type, six such actuators would be provided—three per cavity—but remaining actuators are omitted for the sake of clarity). Each actuator comprises a piston 102 whose two faces are exposed to control pressure in first and second working chambers 104, 204 so that the biasing force applied by each actuator is determined by the difference in these control pressures. Each actuator 100 is coupled to a corresponding roller/carriage of the type illustrated in FIG. 1.

The hydraulic circuit provides a first flow line 106 for supplying hydraulic fluid to the first working chambers 104 and a second flow line 206 for supplying fluid to the second working chambers 204. The first flow line 106 comprises a supply line 112 and a drain line 114. A pump 110 draws hydraulic fluid from a sump 111 (and it should be noted that while the diagram shows the symbol for the pump in several places, these are all the same item: the circuit has one sump only) and supplies a pressurized flow of fluid through the supply line 112 to the first working chambers 104 of the actuators 100. The supply line is branched to connect to all of the working chambers 104. The drain line however is only directly connected to one of these chambers—chamber 104' of actuator 100', referred to as the first master actuator. Pressure in the supply line 112—and hence in the actuator working chambers 104—is controlled by means of a first pressure control valve 116 incorporated in the drain line 114. The degree of opening of this valve is continuously variable and is determined by an electronic control unit (ECU) 117. It is again to be understood that while the symbol for the ECU is seen in two places on the diagram for the sake of representational convenience, these symbols both refer to a single such unit. From the downstream side of the pressure control valve 116, the drain line leads back to the sump 111 from which the hydraulic fluid is recirculated.

The second flow line 206 is similarly formed to the first, comprising a second supply line 212 which supplies pressurized hydraulic fluid from a second pump 210 to the second working chambers 204 and a second drain line 214 leading via a second pressure control valve 216 to the sump 111. The second drain line 214 is connected to working chamber 204" of a second master actuator 100".

The master actuators 100' and 100" provide limits to the actuator travel, as is known in the art. When the pistons 102 move sufficiently far to the left, piston 102' of the first master actuator 100' covers the mouth of the drain line 114, preventing a further exhaustion of fluid therethrough and thus preventing further motion of the pistons to the left. The second master actuator 100" limits travel of the pistons to the right in an equivalent manner.

The ECU 117 monitors pressure in both of the flow lines 106, 206 by means of respective pressure transducers 118, 218 and adjusts the opening of the pressure control valves to control the biasing force applied by the actuators 100.

FIG. 2 also shows a valve arrangement 121 of the "higher pressure wins" type having a respective input connected to both of the supply lines 112, 212. The arrangement supplies via its output 123 hydraulic fluid from whichever supply line is at higher pressure, to a hydraulic ram (item 15 in FIG. 1) for applying the required end load to the variator discs. This feature is in itself well known in the art. Also shown in FIG. 2 are first and second pressure limiting valves 124, 224 connected respectively to the first and second supply lines 112, 212.

Reference has been made above to the need to damp oscillatory motion of the pistons 102 (and the rollers to which they are connected). In the illustrated hydraulic circuit, this damping is largely provided by the pressure control valves 116, 216 which to some degree restrict fluid flow by virtue of the limited opening they provide therefor. The result is a light damping of piston motion which is compatible, under normal operating conditions, with the speed of motion required of the pistons. This damping effect may in some circuits be augmented by placing restricted "damping orifices" in the two flow lines, as indicated in phantom at 119, 219 in FIG. 2. During normal accelerating, braking etc. the hydraulic circuit can provide the rate of fluid flow to/from the actuator working chambers 104 to 204 required to allow the necessary rate of motion of the pistons 102, not withstanding the hydraulic damping.

However when an event such as a rapid brake to rest creates a need for a very rapid change in variator transmission ratio, the known circuit has proved in some cases to be incapable of providing the required rate of fluid flow. For example, in existing prototype transmissions, the maximum flow from the pump 111 is typically 10 liters/second while rapid braking has been found to require flow to the low pressure sides of the actuators 100 as large as 14 liters/second. On the high pressure side, exhaustion of fluid is limited by the size of the flow path through the relevant pressure control valve (and damping orifice, in certain embodiments).

The problem is overcome in the illustrated circuit by means of a valve, in this embodiment a flow control valve 125, which is connected between the first and second flow lines 106, 206, upstream of the pressure control valves 116, 216. In fact in the illustrated embodiment the flow control valve 125 is connected across the drain lines 114, 214. That is, the valve 125 is downstream of the actuator working chambers 104, 204. The flow control valve 125 is normally closed and so does not significantly affect the operation of the hydraulic circuit or the variator as a whole under normal operating conditions. The valve is controlled by the ECU to open when, as in a rapid brake to rest, there is a requirement for particularly rapid ratio change. When opened, the flow control valve 125 provides a route for fluid to flow from one flow line 106, 206 to the other, bypassing the pressure control valves 116, 216. Hence a greater rate of flow of fluid out of the high pressure side of each actuator 100 is made possible, along with a greater rate of flow into the low pressure sides. The effect is that, with the damping effect from the pressure control valves 116, 216 greatly reduced, the variator can very rapidly change ratio. Opening of the valve reduces pressure difference across the two flow lines 106, 206 which resists rapid ratio change.

The control of the flow control valve 125 will now be explained with reference to FIG. 3.

The ECU receives signals representative of several quantities relating to operation of the transmission and of the vehicle as a whole. These include for example brake and throttle pedal positions, engine speed, transmission speed and so on.

In response, the ECU controls, inter alia, the pressure control valves 116, 216 and the flow control valve 125. The degree of opening of the flow control valve 125 is determined by a control current applied thereto, and the size of this current is set by the ECU with reference to a look-up table which is graphically represented in FIG. 3. In this particular embodiment, the control current is set in dependence upon two variables:

i. the transmission ratio, calculated by the ECU based on the engine speed and the transmission output speed; and ii. the rate of vehicle acceleration, calculated as the first differential of the transmission output speed.

Figure 3:
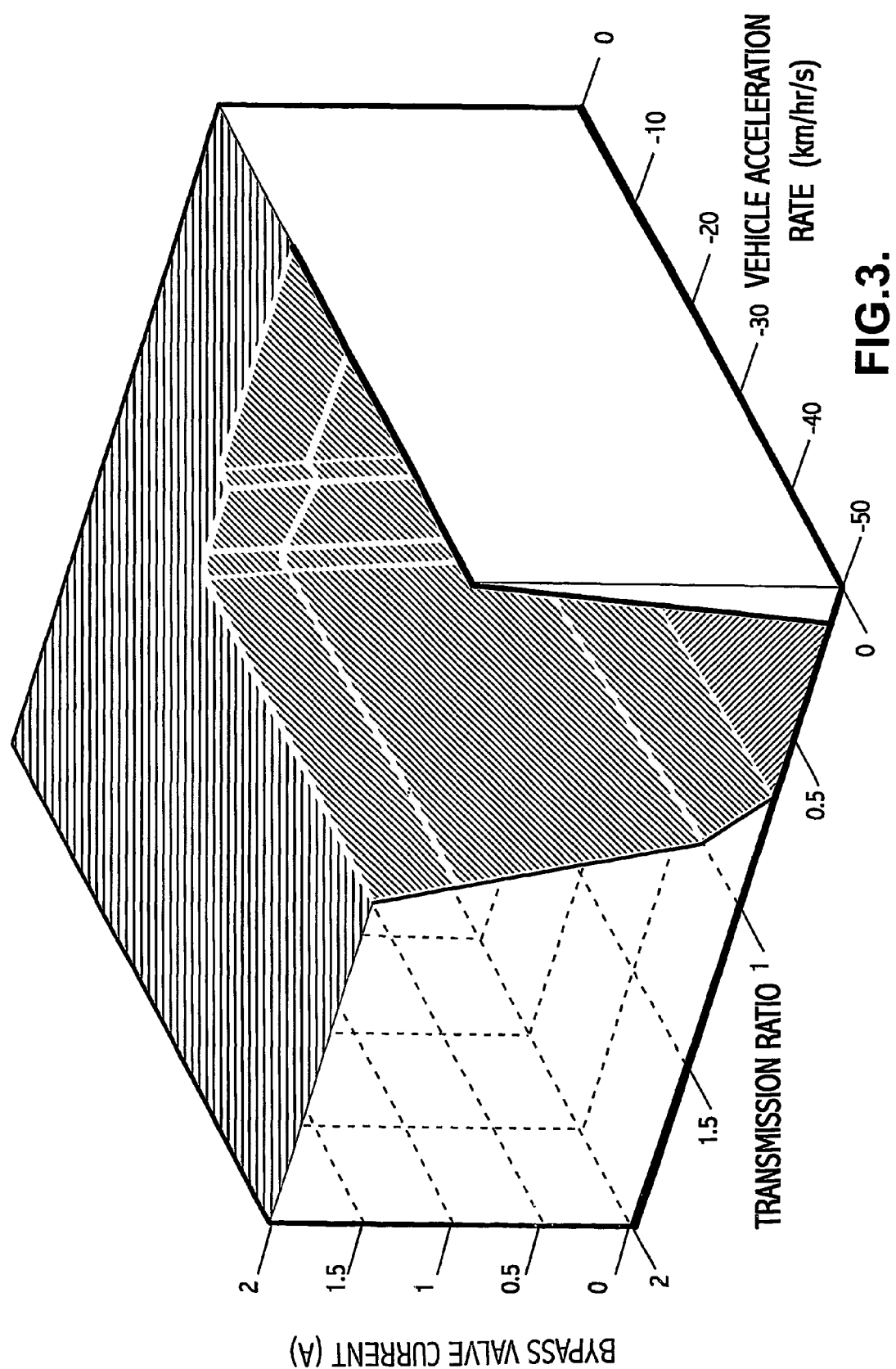
FIG. 3 is a graph showing how a control current applied to a valve of the FIG. 2 circuit is varied.

It must be understood in order to comprehend FIG. 3 that the flow control valve 125 of the present embodiment of the invention is of the type which is fully open when the control current is zero and which requires a current—in this case two amps—to be fully closed. This means that a current must be applied to the valve constantly during normal operation of the transmission. In production versions of the transmission, for the sake of energy efficiency, a valve operating in the opposite sense is likely to be used—ie. a valve which is closed when the control current is zero.

It will be noted from the graph that the ratio of the transmission under consideration can reach zero. This is done without use of a clutch or torque converter to disconnect the engine from the transmission output. Such "geared neutral" operation is well known to those skilled in the art and so will not be explained in detail herein. A known transmission using an epicyclic mixing gear to achieve geared neutral is disclosed for example in GB8429823. It should also be understood that the transmission under consideration has at least two "regimes"—high regime and low regime—the relationship between the ratio provided by the variator and the ratio provided by the transmission as a whole being different in the two regimes. Again, multi-regime transmissions are well known in the art and the necessary gearing arrangements will not be described in detail herein. Low regime provides a low range of ratios including geared neutral. High regime provides a higher range of ratios. A transition from one regime to the other takes place by shifting of regime clutches at a predetermined "synchronous" ratio at which opposite sides of the clutches are revolving at identical speeds.

Turning now to FIG. 3, it can be seen that vehicle acceleration rates below a chosen threshold—in the region indicated at 300—produce no opening of the flow control valve 125. This corresponds to normal driving with moderate rates of ratio change, the flows produced in the variator circuit being accommodated by the pressure control valves 116, 216. Also at high transmission ratios, in the region 302, the flow control valve 125 is not opened. At these high ratios the rate measurement required of the variator rollers, even upon rapid vehicle acceleration, is relatively low. Hence the large level plateau 300, 302 represents "normal" operation, with a two amp current applied to the flow control valve 125 to maintain it in its closed configuration. This is always the case below a certain vehicle acceleration of roughly 15 km/hr/s and also above a certain transmission ratio of roughly 1. The remainder of the graph corresponds to operating conditions in which the flow control valve 125 is at least partially opened in response to rapid change in vehicle speed at relatively low transmission ratio.

Under such conditions, two conflicting requirements must be reconciled. To achieve rapid ratio change, a low level of hydraulic damping of the piston motion is required. As has been explained above, opening of the flow control valve 125, bypassing the pressure control valves 116, 216, achieves this. However there remains the requirement that oscillatory motion of the pistons 102 (and hence the variator rollers) must be kept within acceptable limits.

To appreciate how these requirements are both satisfied, consider what happens as a fast moving vehicle is braked to rest. The transmission ratio is initially high but must fall to zero. Initially the flow control valve is closed but as the transmission ratio falls below about 1, the ramped surface 304 indicates that the valve is progressively opened. Regime change, from high to low during braking, takes place at a ratio of roughly 0.6, in low regime the variator rollers must move faster, for a given vehicle deceleration rate, than in high regime. Hence in a region 306 the valve 125 is fully open. The variator rollers and the pistons 102 must move rapidly in this phase but this un-damped rapid motion is necessarily brief. As the vehicle approaches rest (zero transmission ratio) the requirements change. Stable variator operation in this final phase requires hydraulic damping, and the rates of flow and pressures in the hydraulic circuit are reduced (to understand why, consider that the transmission is approaching the geared neutral state in which no torque is transmitted, corresponding to zero applied force from the hydraulic actuators). Hence as the vehicle approaches rest the flow control valve 125 is rapidly closed, as represented by upwardly turned lip 308.

The invention claimed is:

1. A hydraulic circuit for a continuously variable transmission comprising a continuously variable ratio unit ("variator") which is controllable by means of at least one hydraulic actuator acting on a movable torque transmission element of the variator, the actuator having opposed first and second working chambers, the circuit comprising first and second flow lines both connected to respective actuator working chambers for feeding fluid thereto and therefrom and means for supplying fluid flow through both of the flow lines, variable control valve means being incorporated in both flow lines for generating an adjustable back pressure therein, a further valve having a variable opening and being connected between the two flow lines, upstream of the variable control valve means, whereby opening of the further valve enables flow of fluid from one flow line to the other in order to reduce pressure difference between the lines, and an electronic control unit (ECU) whereby the state of the further valve is determined in dependence on measured transmission and/or vehicle operating conditions, the ECU being arranged to detect a requirement for rapid ratio change and to open the further valve in response.

2. A hydraulic circuit for a continuously variable transmission comprising a continuously variable ratio unit ("variator") which is controllable by means of at least one hydraulic actuator acting on a movable torque transmission element of the variator, the actuator having opposed first and second working chambers, the circuit comprising first and second flow lines both connected to respective actuator working chambers for feeding fluid thereto and therefrom and means for supplying fluid flow through both of the flow lines, variable control valve means being incorporated in both flow lines for generating an adjustable back pressure therein, and a further valve having a variable opening and being connected between the two flow lines, upstream of the variable control valve means, whereby opening of the further valve enables flow of fluid from one flow line to the other in order to reduce pressure difference between the lines, wherein the hydraulic control circuit is operable in low and high regimes and has an ECU arranged to monitor transmission regime and to open the further valve fully only in low regime.

3. A hydraulic circuit for a continuously variable transmission comprising a continuously variable ratio unit ("variator") which is controllable by means of at least one hydraulic actuator acting on a movable torque transmission element of the variator, the actuator having opposed first and second working chambers and the circuit comprising first and second flow lines both connected to respective actuator working chambers for feeding fluid thereto and therefrom and means for supplying fluid flow through both of the flow lines, variable control valve means being incorporated in both flow lines for generating an adjustable back pressure therein, and a further valve having a variable opening and being connected between the two flow lines, upstream of the variable control valve means, whereby opening of the further valve enables flow of fluid from one flow line to the other in order to reduce pressure difference between the lines, the continuously variable transmission having a geared neutral, wherein an ECU is arranged such that after opening the further valve during deceleration, the ECU progressively closes the further valve as the transmission approaches geared neutral.

4. A hydraulic control circuit as claimed in claim 3 wherein the further valve is a flow control valve.

5. A hydraulic control circuit as claimed in claim 3 wherein the ECU is arranged to monitor vehicle acceleration and to control the further valve in dependence thereupon.

6. A hydraulic control circuit as claimed in claim 3 wherein the ECU is arranged to monitor transmission ratio and to control the further valve in dependence thereupon.

7. A hydraulic control circuit as claimed in claim 1 for a continuously variable transmission operable in low and high regimes, the ECU being arranged to monitor transmission regime and to open the further valve fully only in low regime.

8. A hydraulic control circuit as claimed in claim 1 for a continuously variable transmission having geared neutral, wherein the ECU is arranged such that after opening the further valve during deceleration, it progressively closes the further valve as the transmission approaches geared neutral.

9. A continuously variable transmission comprising a toroidal race, rolling traction variator and a hydraulic circuit as claimed in claim 1.

10. A continuously variable transmission as claimed in claim 1 wherein the variator is a torque control variator.

11. A hydraulic control circuit as claimed in claim 2 wherein the further valve is a flow control valve.

12. A hydraulic control circuit as claimed in claim 2 wherein the ECU is arranged to detect a requirement for rapid ratio change and to open the further valve in response.

13. A hydraulic control circuit as claimed in claim 2 wherein the ECU is arranged to monitor vehicle acceleration and to control the further valve in dependence thereupon.

14. A hydraulic control circuit as claimed in claim 2 wherein the ECU is arranged to monitor transmission ratio and to control the further valve in dependence thereupon.

15. A hydraulic control circuit as claimed in claim 2 for a continuously variable transmission having geared neutral, wherein the ECU is arranged such that after opening the further valve during deceleration, it progressively closes the further valve as the transmission approaches geared neutral.

16. A continuously variable transmission comprising a toroidal race, rolling traction variator and a hydraulic circuit as claimed in claim 2.

17. A continuously variable transmission as claimed in claim 2 wherein the variator is a torque control variator.

18. A hydraulic control circuit as claimed in claim 3, wherein the electronic control unit (ECU) determines the state of the further valve in dependence on measured transmission and/or vehicle operating conditions.

19. A hydraulic control circuit as claimed in claim 3 wherein the further valve is a flow control valve.

20. A hydraulic control circuit as claimed in claim 3 wherein the ECU is arranged to detect a requirement for rapid ratio change and to open the further valve in response.

21. A hydraulic control circuit as claimed in claim 3 wherein the ECU is arranged to monitor vehicle acceleration and to control the further valve in dependence thereupon.

22. A hydraulic control circuit as claimed in claim 3 wherein the ECU is arranged to monitor transmission ratio and to control the further valve in dependence thereupon.

23. A continuously variable transmission comprising a toroidal race, rolling traction variator and a hydraulic circuit as claimed in claim 3.

24. A continuously variable transmission as claimed in claim 3 wherein the variator is a torque control variator.

* * * * *